(12) United States Patent
Zhou et al.

(10) Patent No.: US 9,525,733 B2
(45) Date of Patent: Dec. 20, 2016

(54) METHOD AND SYSTEM FOR DATA SYNCHRONIZATION

(71) Applicant: TENCENT TECHNOLOGY (SHENZHEN) COMPANY LIMITED, Shenzhen (CN)

(72) Inventors: Zhihao Zhou, Shenzhen (CN); Ming Tian, Shenzhen (CN); Li Liu, Shenzhen (CN); Xingcai Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/749,579

(22) Filed: Jun. 24, 2015

(65) Prior Publication Data

US 2015/0312340 A1    Oct. 29, 2015

Related U.S. Application Data

(63) Continuation of application No. PCT/CN2013/084463, filed on Sep. 27, 2013.

(30) Foreign Application Priority Data

Dec. 25, 2012 (CN) .......................... 2012 1 0570241

(51) Int. Cl.
*H04L 29/08* (2006.01)
*G06F 17/30* (2006.01)

(52) U.S. Cl.
CPC ..... *H04L 67/1095* (2013.01); *G06F 17/30079* (2013.01); *G06F 17/30088* (2013.01);
(Continued)

(58) Field of Classification Search
CPC .................. G06F 17/30079; G06F 17/30088; G06F 17/30174; G06F 17/30575; H04L 67/1095; H04L 67/1097
(Continued)

(56) References Cited

U.S. PATENT DOCUMENTS

| 5,784,503 | A  | * | 7/1998 | Bleecker, III | ........... | G06T 9/007 348/159 |
| 6,259,829 | B1 | * | 7/2001 | Bleecker, III | ........... | G06T 9/007 358/410 |

(Continued)

FOREIGN PATENT DOCUMENTS

| CN | 101316161 A | 12/2008 |
| CN | 101166309 B | 6/2010 |
| CN | 102124450 A | 7/2011 |

OTHER PUBLICATIONS

The World Intellectual Property Organization (WIPO) International Search Report for PCT/CN2013/084463 Jan. 9, 2014.

*Primary Examiner* — Alina N Boutah
(74) *Attorney, Agent, or Firm* — Anova Law Group, PLLC (57) ABSTRACT

A data synchronization method is provided. The data synchronization method includes providing a first server with a master flag and a write flag for a data block; providing a second server; and importing a snapshot of the data block to the second server. The method further includes configuring a synchronizing flag for the data block on the second server; synchronizing, by a synchronizing component, data of the data block on the first server to the second server; and removing the write flag of the data block on the first server when the data block is to be migrated out of the first server. The method also includes synchronizing, by the synchronizing component, latest data of the data block on the first server to the second server; removing the master flag of the
(Continued)

data block on the first server and removing the synchronizing flag of the data block on the second server after data of the data block on the second server and the data of the data block on the first server are completely synchronized; and configuring a master flag and a write flag for the data block on the second server.

8 Claims, 4 Drawing Sheets

(52) U.S. Cl.
CPC .. *G06F 17/30174* (2013.01); *G06F 17/30575* (2013.01); *H04L 67/1097* (2013.01)

(58) Field of Classification Search
USPC ......... 709/216–219, 208–212; 707/640–641, 707/802, 809
See application file for complete search history.

(56) References Cited

U.S. PATENT DOCUMENTS

| | | | |
|---|---|---|---|
| 9,047,312 B1* | 6/2015 | Ten-Pow | G06F 17/3023 |
| 2003/0088442 A1* | 5/2003 | Michael | G06F 19/327 |
| | | | 705/3 |
| 2004/0260953 A1 | 12/2004 | Jamieson et al. | |
| 2007/0094466 A1* | 4/2007 | Sharma | G06F 3/0605 |
| | | | 711/162 |
| 2008/0168072 A1* | 7/2008 | Freedman | G06F 17/30581 |
| 2009/0092374 A1* | 4/2009 | Kulas | H04N 7/173 |
| | | | 386/248 |
| 2010/0293143 A1* | 11/2010 | Jayaraman | G06F 17/30566 |
| | | | 707/640 |
| 2015/0234712 A1* | 8/2015 | Fei | G06F 17/30088 |
| | | | 707/639 |

* cited by examiner

METHOD AND SYSTEM FOR DATA SYNCHRONIZATION

RELATED APPLICATION

This application by Tencent Technology (Shenzhen) Company Limited claims priority to PCT/CN2013/084463 filed on Sep. 27, 2013, which claims priority to Chinese Patent Application No. 201210570241.0, filed with the Chinese Patent Office on Dec. 25, 2012 and entitled "Method and System for Data Synchronization." The two applications are incorporated herein by reference in their entirety.

FIELD OF THE TECHNOLOGY

The present disclosure relates to the field of data synchronization technologies, and in particular, to a data synchronization method and system.

BACKGROUND OF THE DISCLOSURE

Microblog is a typical user generated content (UGC) service. Data generation is closely related to behaviors of a user. When data cannot be written to an underlying storage server because of an error or operation and maintenance issues, a user may conclude that there is an error in the background system.

To reduce the impact by an error of an underlying service on user experience, a common method is using flexible policies. For example, only some available data may be returned when the error occurs, or data of some duplicates may be used in reading data. In this scenario, generally, affected data is un-writable. Further, all write operations of the user may fail. To lower the impact of a factor such as a machine error on the user, a fast data recovery and operation and maintenance means is needed.

In the existing technology, redoing logs is a common way to recover data by a background service. For example, a log of a write action is first recorded locally or remotely, and when a machine has an error, the write action in the log can be replayed to recover data.

Redoing the log requires replay of the original write sequence number (Seq), to ensure the correct sequence of write actions. However, a recovery starting from Seq=0 generally costs a lot of time (equivalent to performing all write actions over). Therefore, besides the log redoing, a data snapshot technology may be further needed to export a snapshot of memory data to a magnetic disk and record a Seq of an export moment. Before a data recovery, the snapshot may be first loaded to memory. The log redoing may be continued from a Seq of the snapshot point, thereby reducing the time spent in redoing the log.

In a conventional solution, when a master device has an error in performing data migration, a data snapshot of a current day or a previous day needs to be acquired first. Then a log file is acquired from a master device (or a log is acquired remotely). Before the log is duplicated, it is required to inhibit writing to the master device, thereby ensuring data consistency in a migration process. If data is written to an old machine but a log is not duplicated to a new master device, loss of the data may be caused. Therefore, generally, in a data recovery process, operations such as snapshot duplication, master device write inhibition, log duplication, snapshot recovery, and log redoing need to be performed in sequence.

Because in the conventional solution, it is required to perform complex log redoing operations, writing to a master device may need to be inhibited for a long time, an un-writable time for the external user (that is, for a user) may be long. A user obviously can experience the error in the system operations.

SUMMARY

Embodiments of the present invention provide a data synchronization method and system, to avoid complex log redoing operations in a conventional method, and greatly shorten an un-writable time for the external, thereby reducing the sense of a user on operation and maintenance operations such as data migration or a machine error.

On aspect of the present invention provides a data synchronization method. The data synchronization method includes providing a first server with a master flag and a write flag for a data block; providing a second server; and importing a snapshot of the data block to the second server. The method further includes configuring a synchronizing flag for the data block on the second server; synchronizing, by a synchronizing component, data of the data block on the first server to the second server; and removing the write flag of the data block on the first server when the data block is to be migrated out of the first server. The method also includes synchronizing, by the synchronizing component, latest data of the data block on the first server to the second server; removing the master flag of the data block on the first server and removing the synchronizing flag of the data block on the second server after data of the data block on the second server and the data of the data block on the first server are completely synchronized; and configuring a master flag and a write flag for the data block on the second server.

Another aspect of the present invention also provides a data synchronization method. The data synchronization method includes: providing a first server configuring a synchronizing flag for a data block; providing a second server configuring a master flag and a write flag for the data block; and synchronizing, by a synchronizing component, data of the data block on the second server to the first server. The method further includes removing the master flag of the data block on the second server and removing the synchronizing flag of the data block on the first server if an error occurs on the second server, and configuring a master flag and a write flag for the data block on the first server; importing a snapshot of the data block to the second server after the second server recovers from the error; and configuring a synchronizing flag for the data block on the second server. The method further includes synchronizing, by the synchronizing component, data of the data block on the first server to the second server; removing the write flag of the data block on the first server when a master status of the second server for the data block is to be restored; synchronizing, by the synchronizing component, latest data of the data block on the first server to the second server; and removing the master flag of the data block on the first server and removing the synchronizing flag of the data block on the second server after data of the data block on the second server and data of the data block on the first server are completely synchronized, and configuring a master flag and a write flag for the data block on the second server and configuring a synchronizing flag for the data block on the first server.

Another aspect of the present invention provides a data synchronization system, comprising. The system includes a first server; a second server; a configuring module, configured to generate a master flag and a write flag for the data block on the first server; an import module, configured to import a snapshot of the data block to the second server; and a synchronizing component, configured to synchronize data of the data block on the first server to the second server. Further, the configuring module is further configured to generate a synchronizing flag for the data block on the second server; to remove the write flag of the data block on the first server when the data block is to be migrated out of the first server; and to remove the master flag of the data block on the first server and remove the synchronizing flag of the data block on the second server after data of the data block on the second server and data of the data block on the first server are completely synchronized, and to generate a master flag and a write flag for the data block on the second server.

Another aspect of the present invention provides a data synchronization system, comprising. The system includes a first server; a second server; a configuring module, configured to generate a synchronizing flag for a data block on the first server, and configured to generate a master flag and a write flag for the data block on the second server; a synchronizing component, configured to synchronize data of the data block on the second server to the first server; and an import module, configured to import a snapshot of the data block to the second server after the second server recovers from the error. Further, the configuring module is further configured to remove the master flag of the data block on the second server and remove the synchronizing flag of the data block on the first server if an error occurs on the second server, and generate a master flag and a write flag for the data block on the first server; and to generate a synchronizing flag for the data block on the second server after the second server recovers from the error. The synchronizing component is further configured to synchronize data of the data block on the first server to the second server after the second server recovers from the error. The configuring module is further configured to remove the write flag of the data block on the first server when a master status of the second server for the data block is to be restored; and to remove the master flag of the data block on the first server and remove the synchronizing flag of the data block on the second server after data of the data block on the second server and data of the data block on the first server are completely synchronized, and generate a master flag and a write flag for the data block on the second server and generate a synchronizing flag for the data block on the first server.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a data synchronization method and system. To make the objectives, technical solutions, and advantages of the present disclosure clearer, the following further describes the implementation manners of the present disclosure in detail with reference to the accompanying drawings.

Before the data synchronization method and system provided in the embodiments of the present invention are described, a concept of switching between master and slave devices provided in the embodiments of the present invention is first introduced. The switch between master and slave devices is a method in which in a server architecture equipped with a master server and a slave server, a configuration center degrades the master server from being the writing designation and upgrades the slave server to be the writing designation. After the switch between the master and slave devices, the original slave server is upgraded to a master server, and the original master server is degraded to a slave server.

Figure 1:
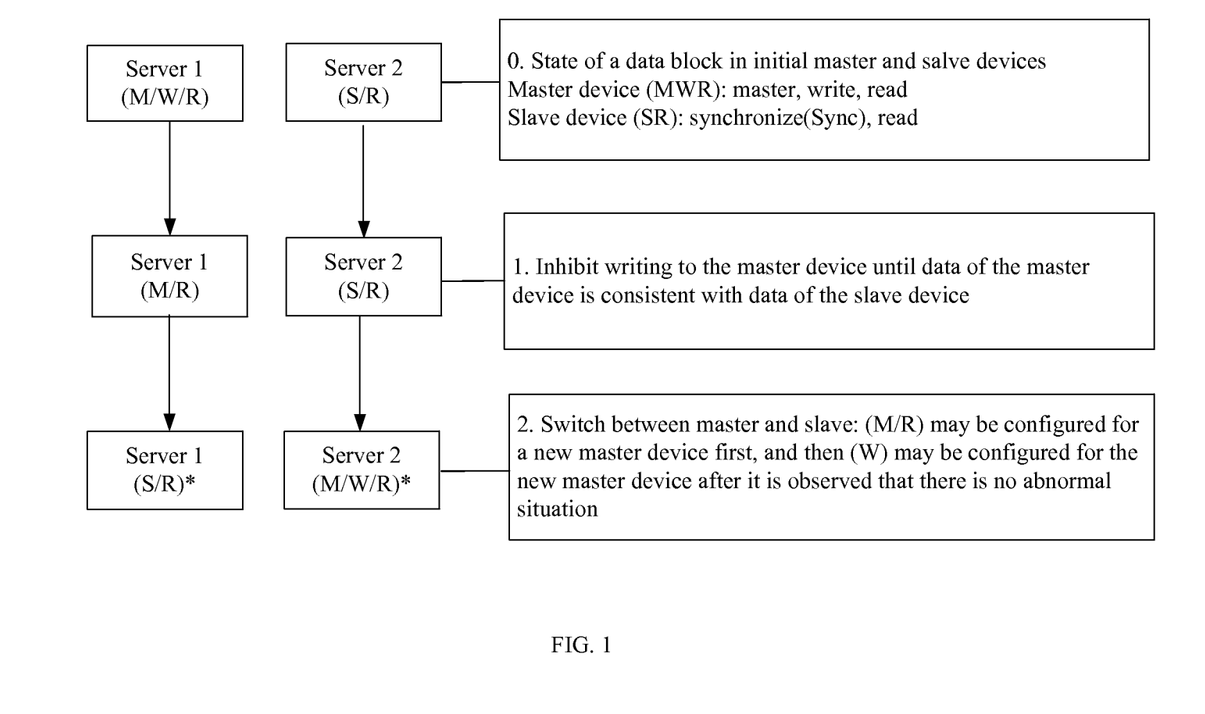
FIG. 1 is a schematic diagram of state changes of a flag bit of a data block in a process of switching between master and slave devices according to an embodiment of the present invention.

Referring to FIG. 1, FIG. 1 is a schematic diagram of state changes of a flag bit of a data block in a process of switching between master and slave devices according to an embodiment of the present invention. Initially, a server 1 configures a master flag (M), a write flag (W), and a read flag (R) for data; and a server 2 configures a synchronizing flag (S) and a read flag (R) for data. The server 1 is a master server of the data and a writing designation of the data; and the server 2 is a slave server of the data and can receive data from the master server for synchronization, to establish a data duplication on the slave server. After the two servers perform data synchronization, data on the slave server and data on the master server are consistent, except for latest data that have just been written to the master server and is being synchronized to or is waiting to be synchronized with the slave server.

Before switching between master and slave devices, the configuration center first inhibits writing to the server 1, that is, it removes the write flag (W) of the data on the server 1, and maintains the master flag (M) of the data on the server 1 and the synchronizing flag (S) of the data on the server 2, so that the latest data that is just written to the master server can still be synchronized to the slave server in a write-inhibited period of the master server. This is to ensure that data on the slave server and data on the master server are completely consistent and to make the data on the slave server and the data on the master server get to a same synchronization point.

After the data on the slave server and the data on the master server get to a same synchronization point, an operation of switching between master and slave can be performed. The configuration center removes the master flag (M) of the data on the server 1 and the synchronizing flag (S) of the data on the server 2, configures a master flag (M) and a write flag (W) for the data on the server 2, and configures a synchronizing flag (S) for the data on the server 1. In this case, the server 2 is upgraded to be a new master server of data, and the server 1 is degraded to be a new slave server of data, thereby completing a process of switching between master and slave devices.

Figure 2:
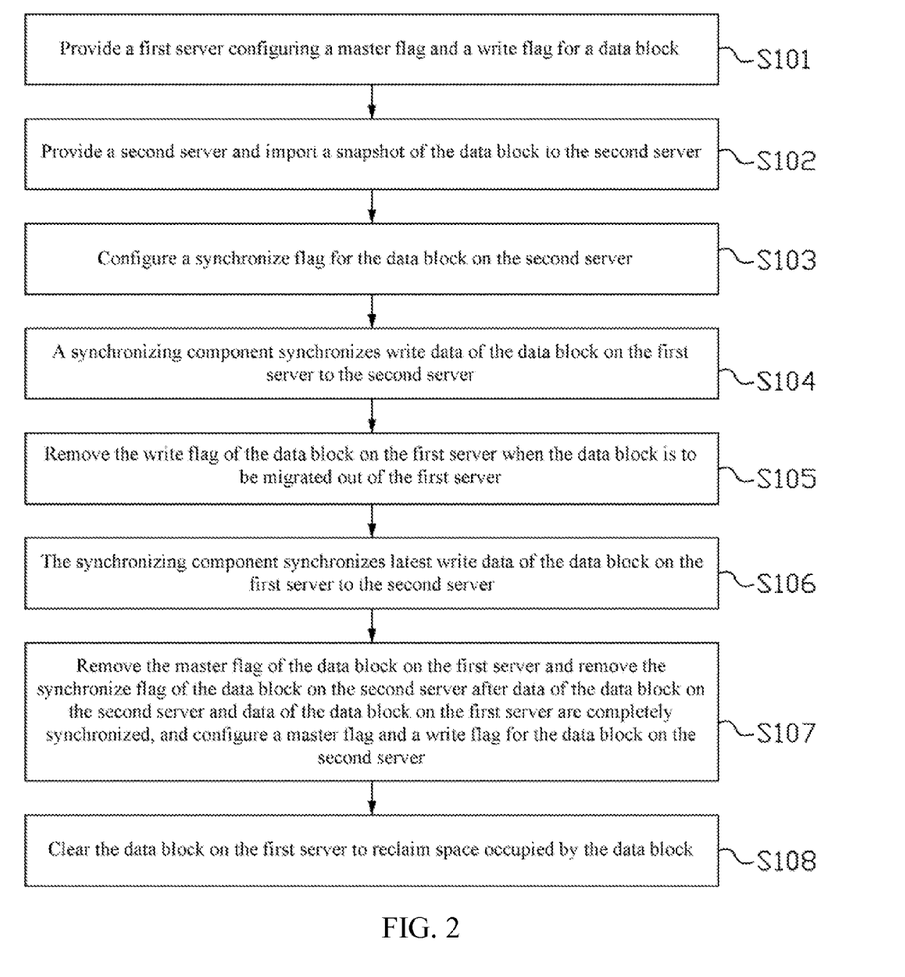
FIG. 2 is a flowchart of a data synchronization method according to a first embodiment of the present invention.

Referring to FIG. 2, FIG. 2 is a flowchart of a data synchronization method according to a first embodiment of the present invention. In this embodiment, the data synchronization method is applicable to migration of data from one master server to another server. When a master server stores multiple data blocks such as a data block A, a data block B, and a data block C, and continuously receives externally written data from a user, if the amount of externally written data of a data block therein (for example, the data block A) is extremely large and the data block expands fast, the data block A may be individually migrated to another server and the second server is configured to be a master server of the data block A, so that the another server becomes a writing designation of the data block A. In this way, storage pressure of the original master server can be relieved and the original master server can still be used as a writing designation of the other data blocks (the data block B, the data block C, and the like) that contain a relatively small amount of data. The data synchronization method includes the following steps.

Step S101: Provide a first server with a master flag and a write flag for a data block.

Because the first server configures the master flag (M) and the write flag (W) for the data block, the first server is a master server of the data block and can receive data written externally for the data block. Specifically, a configuration center may generate the master flag (M) and the write flag (W) for the data block on the first server; and further, may also generate a read flag (R) for the data block on the first server, so that the first server can further provide a read function of the data block to the user at the same time.

Step S102: Provide a second server and import a snapshot of the data block to the second server.

For example, the snapshot of the data block may be imported from a standby center to the second server Step S103: Generate a synchronizing flag for the data block on the second server.

If a data block (for example, a data block A) on the first server expands fast and the data block A needs to be migrated from the first server to another new server, a new device is provided as a second server and the snapshot of the data block is imported to the second server.

Generally, a snapshot is taken regularly (for example, at a certain time every morning) for data in a server, and the snapshot is stored in the standby center for future use in recovering data. When a snapshot is taken, a snapshot may be taken for data of a master server and a snapshot may also be taken for data of a slave server. In addition, because the master server is a writing designation, the master server further records a complete write operation log (Binlog) for data synchronization or recovery.

When the data block A on the first server needs to be migrated to the second server, it is first required to set up the second server to be a slave server for the data block A, so that the first server and the second server are in a master and slave relationship with respect to the data block A. This enables synchronizing data in the data block A to the second server by using a synchronizing component. Therefore, a snapshot of the data block A in recent time (a current day or a previous day) may be first acquired from the standby center; the snapshot is imported to the second server. Then a synchronizing flag (S) is configured for the data block on the second server, so that the second server becomes a slave server of the data block A, and the synchronizing component can send data, newly written after a snapshot point, of the data block A from the first server to the second server for incremental data synchronization. This process avoids spending a lot of time on full synchronization of data from Seq=0, thereby greatly reduces the time spent on the entire data migration.

Specifically, when a synchronizing flag (S) is configured for the data block on the second server, the configuration center may configure the synchronizing flag (S) for the second server. Further, a read flag (R) may further be configured for the data block on the second server, so that the second server can further provide a read function of the data block for the external at the same time.

Step S104: A synchronizing component synchronizes data of the data block on the first server onto the second server.

The synchronizing component may be a general or interchangeable data synchronizing component. The synchronizing component is configured to synchronize write data received by a master server to a corresponding slave server. The implementation principle of the synchronizing component is to read a write operation log recorded in a master server, and push the write operation log to a slave server according to a log Seq required by the slave server, so as to synchronize data to the slave server according to a write operation sequence of the master server. Such modules that push data of a master server to a slave server according to a write Seq are generally referred to as a synchronizing component. The synchronizing component has a feature of synchronizing data on a master server marked with a master flag (M) to a slave server marked with a synchronizing flag (S), and therefore, after the first server and the second server are in a master and slave relationship with respect to the data block A, the synchronizing component can send write data (with a write operation log) of the data block A on the first server to the second server for data synchronization of the data block A, so that data of the data block A on the second server and data of the data block A on the first server are maintained in a synchronized state.

Step S105: Remove the write flag of the data block on the first server when the data block is to be migrated out of the first server.

Step S106: The synchronizing component synchronizes latest data of the data block on the first server to the second server.

When the data block A is to be migrated out of the first server, the configuration center may remove the write flag (W) of the data block A on the first server, so that for the data block A, the first server is in a write-inhibited state. In the foregoing step S104, after the second server and the first server synchronize data of the data block A, the data of the data block A on the second server and data of the data block A on the first server are consistent, except for latest data that is just written to the first server and is being synchronized to or is waiting to be synchronized with the second server. To make the data of the data block A on the second server and the data of the data block A on the first server completely synchronized, that is, get to a same synchronization point, in this case, the configuration center may remove the write flag (W) of the data block A on the first server and inhibit writing to the first server for a short time (for example, several seconds). In the write-inhibited period, the master flag (M) of the data block A on the first server and the synchronizing flag (S) of the data block A on the second server are maintained, so that the first server and the second server still are in a master and slave relationship with respect to the data block A. The synchronizing component pushes the latest data that is just written to the data block A on the first server to the second server for data synchronization, so that the data of the data block A on the second server are completely consistent with the data of the data block A on the first server by synchronization, thereby making the data of the data block A on the second server and the data of the data block A on the first server get to a same synchronization point.

Step S107: Remove the master flag of the data block on the first server and remove the synchronizing flag of the data block on the second server after data of the data block on the second server and data of the data block on the first server are completely synchronized, and generate a master flag and a write flag for the data block on the second server.

After inhibition of writing to the data block A on the first server, and after the data of the data block A on the second server is completely synchronized with the data of the data block A on the first server, the configuration center may remove the master flag (M) of the data block A on the first server and remove the synchronizing flag (S) of the data block A on the second server, and generate a master flag (M) for the data block A on the second server. In this case, the second server is upgraded to a new master server of the data block A. After it is confirmed that the new master server works normally, the configuration center may generate a write flag (W) for the data block A on the second server, and external data write of the data block A is migrated to the second server (that is, the new master server).

Further, optionally, after the master flag (M) of the data block A on the first server is removed, the method further includes:

Step S108: Clear the data block on the first server to reclaim space occupied by the data block.

After the data block A is migrated out, the data block A is removed from the first server. After the data block A on the first server is removed, space occupied by the data block A can be reclaimed. The reclaimed space may be used by another data block (such as, a data block B or a data block C) on the first server.

Figure 3:
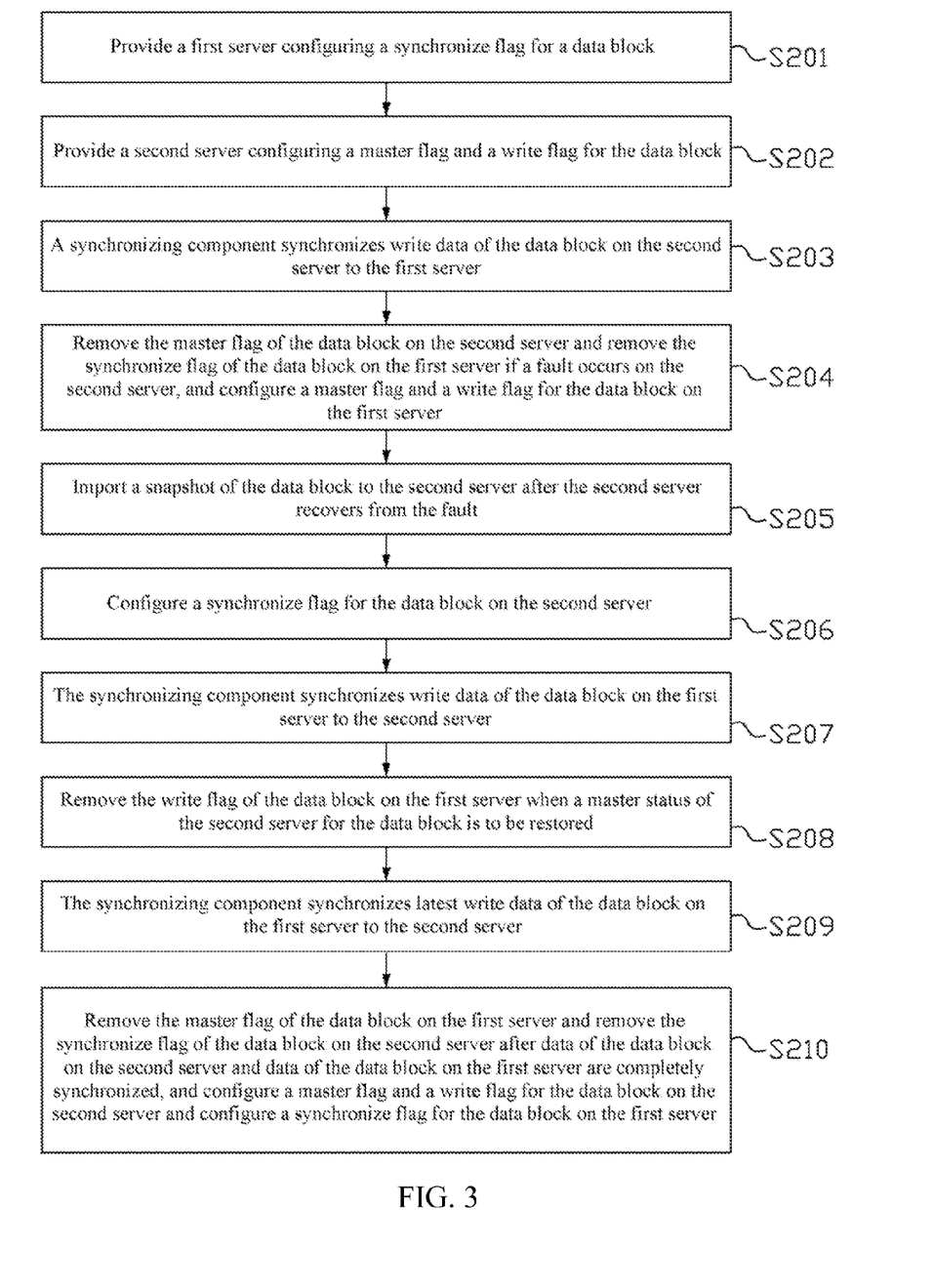
FIG. 3 is a flowchart of a data synchronization method according to a second embodiment of the present invention.

Referring to FIG. 3, FIG. 3 is a flowchart of a data synchronization method according to a second embodiment of the present invention. In this embodiment, the data synchronization method is applicable to a synchronization processing of data when an error occurs on a master server. The data synchronization method includes the following steps.

Step S201: Provide a first server with a synchronizing flag for a data block.

Because the first server configures the synchronizing flag (S) for the data block, the first server is a slave server of the data block. Specifically, a configuration center may configure the synchronizing flag (S) for the data block on the first server; and further, a read flag (R) may further be configured for the data block on the first server, so that the first server may further provide a read function of the data block for the external at the same time.

Step S202: Provide a second server with a master flag and a write flag for the data block.

Because the second server configures the master flag (M) and the write flag (W) for the data block, the second server is a master server of the data block and can receive data written externally for the data block. Specifically, the configuration center may configure the master flag (M) and the write flag (W) for the data block on the second server; and further, a read flag (R) may further be configured for the data block on the second server, so that the second server may further provide a read function of the data block for the external at the same time.

Step S203: A synchronizing component synchronizes data of the data block on the second server to the first server.

The synchronizing component is a general or interchangeable data synchronizing component, and is configured to synchronize write data received by a master server to a corresponding slave server. The implementation principle of the synchronizing component is to read a write operation log recorded in a master server, and push the write operation log to a slave server according to a log Seq required by the slave server, so as to synchronize to the slave server according to a write operation sequence of the master server. Such modules that push data of a master server to a slave server according to a write Seq are generally referred to as a synchronizing component. The synchronizing component has a feature of synchronizing data on a master server marked with a master flag (M) to a slave server marked with a synchronizing flag (S), and therefore, after the second server and the first server are in a master and slave relationship with respect to a data block, the synchronizing component can send write data (a write operation log) of the data block on the second server to the first server for data synchronization, so that data of the data block on the first server and data of the data block on the second server are maintained in a synchronized state.

Step S204: Remove the master flag of the data block on the second server and remove the synchronizing flag of the data block on the first server if an error occurs on the second server, and generate a master flag and a write flag for the data block on the first server.

When the second server cannot provide a normal service due to an error such as a crash or hardware damage, the configuration center may instruct to remove the master flag (M) of the data block on the second server and remove the synchronizing flag (S) of the data block on the first server, and generate a master flag (M) and a write flag (W) for the data block on the first server. Then the first server is directly upgraded to a new master server of the data block, and data written externally for the data block is migrated from the second server (an original master server) to the first server (that is, the new master server), thereby changing a writing designation of the data block and recovering external data write in a shortest time.

Step S205: Import a snapshot of the data block to the second server after the second server recovers from the error.

For example, the snapshot of the data block may be imported from a standby center to the second server.

Step S206: Generate a synchronizing flag for the data block on the second server.

Generally, a snapshot is taken regularly (for example, at some time every morning) for data in a server, and the snapshot is stored in the standby center for future use in recovering data; when a snapshot is taken, a snapshot may be taken for data of a master server and a snapshot may also be taken for data of a slave server. In addition, because the master server is a writing designation, the master server further records a complete write operation log (Binlog) for data synchronization or recovery.

After the second server recovers from the error, a snapshot of the data block in recent time (a current day or a previous day) may be first acquired from the standby center, the snapshot is imported to the second server, and then the configuration center configures a synchronizing flag (S) for the data block on the second server, so that the second server becomes a slave server of the data block, and the first server and the second server currently are in a master and slave relationship with respect to the data block, and the synchronizing component can send data, newly written after a snapshot point, of the data block from the first server to the second server for incremental data synchronization, thereby greatly reducing the time spent on data synchronization.

Step S207: The synchronizing component synchronizes data of the data block on the first server to the second server.

After the foregoing steps S205 and S206, the first server and the second server are in a master and slave relationship with respect to the data block. Therefore, the synchronizing component can send write data (a write operation log) of the data block on the first server to the second server for data synchronization, so that data of the data block on the second server and data of the data block on the first server are maintained in a synchronized state.

Step S208: Remove the write flag of the data block on the first server when a master status of the second server for the data block is to be restored.

Step S209: The synchronizing component synchronizes latest data of the data block on the first server to the second server.

Another switch between master and slave is needed after the second server is recovered to provide a normal service, to switch the main writing designation from the current first server back to the original master device, that is, the second server, so that the master status of the second server is restored. This is because the second server, which was originally used as a master device, has more performance advantages in physical deployment than the first server, which was originally used as a slave device. For example, the second server may have a good network condition or is close to an access server. In the foregoing step S207, the data of the data block on the first server is synchronized to the second server, so that data of the data block on the second server and data of the data block on the first server are consistent, except for latest data that is just written to the first server and is being synchronized to or is waiting to be synchronized with the second server. When the master status of the second server is being restored, the configuration center may remove the write flag (W) of the data block on the first server, inhibit writing to the first server for a short time (for example, for several seconds), and at the same time, maintain the master flag (M) of the data block on the first server and the synchronizing flag (S) of the data block on the second server in the write-inhibited period. The synchronizing component sends the latest data written to the data block on the first server to the second server for synchronization, so that the data of the data block on the second server are completely consistent with the data of the data block on the first server by synchronization, thereby making the data of the data block on the second server and the data of the data block on the first server get to a same synchronization point.

Step S210: Remove the master flag of the data block on the first server and remove the synchronizing flag of the data block on the second server after the data of the data block on the second server and data of the data block on the first server are completely synchronized, and generate a master flag and a write flag for the data block on the second server and generate a synchronizing flag for the data block on the first server.

After the data of the data block on the second server and the data of the data block on the first server get to a same synchronization point, the configuration center may remove the master flag (M) of the data block on the first server and remove the synchronizing flag (S) of the data block on the second server, and generate a master flag (M) and a write flag (W) for the data block on the second server and generate a synchronizing flag (S) for the data block on the first server, so that the second server becomes a master server of the data block and the first server becomes a slave server of the data block. In this case, the second server is restored to the original master status and the first server is restored to the original slave status. The external data write of the data block is migrated to the second server again. The entire data synchronization and recovery process triggered by the error occurring on the second server is completed.

The data synchronization method provided in the foregoing embodiments may be applied to data synchronization processing in the case of migration of data of a master server or in providing a normal service by a master server when encountering to an error. When data is migrated, a synchronize identifier is configured for a new device, and the new device is set up to be a slave device. Then a feature of a synchronizing component is used. The synchronizing component synchronizes data on the master server to the new device set up to be the slave device, thereby avoiding complex log redoing operations in a conventional method. Moreover, in the entire data migration process, it is only required to inhibit writing to the master server for a short time before a writing designation of data is changed. When an error occurs on the master server, a slave server is directly upgraded to a new master server, to fast change a writing designation of data and recover external data write in time, thereby avoiding performing complex log redoing operations on the master server after the master server recovers from the error. In addition, if the writing designation of data is switched back to the original master server, it is only required to inhibit writing to the current master server for a short time before the writing designation is switched. Therefore, in the foregoing data synchronization method, it takes a very short time to switch a writing designation of data, external data can be written again in a short time, and a user does not need to wait for a long time. Embodiments of the present disclosure thus avoid long waiting time due to a long write-inhibited operation on the master server in the conventional method and greatly improve user experience when there is one or more background operation and maintenance errors. Embodiments of the present disclosure also simplify the error recovery process and decrease the operation and maintenance cost.

Figure 4:
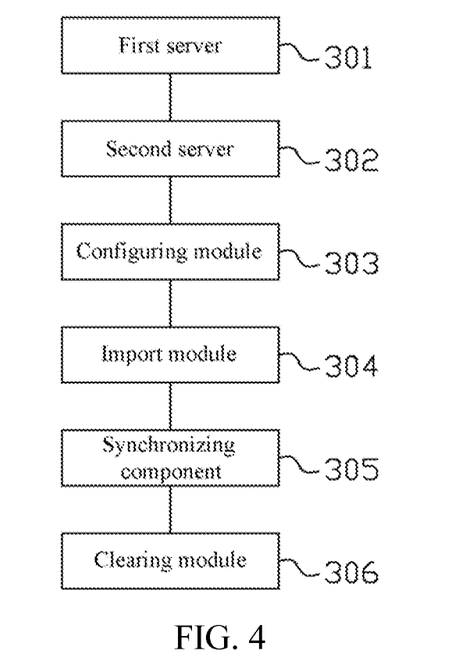
FIG. 4 is a schematic structural diagram of a data synchronization system according to a first embodiment of the present invention.

Referring to FIG. 4, FIG. 4 is a schematic structural diagram of a data synchronization system according to a first embodiment of the present invention, and the data synchronization system includes: a first server 301; a second server 302; a configuring module 303, an import module 304, and a synchronizing component 305. The configuring module 303 is configured to generate a master flag and a write flag for the data block on the first server 301. The import module 304 is configured to import a snapshot of the data block to the second server 302. The configuring module 303 is further configured to generate a synchronizing flag for the data block on the second server 302. The synchronizing component 305, is configured to synchronize data of the data block on the first server 301 to the second server 302, where the configuring module 303 is further configured to remove the write flag of the data block on the first server 301 when the data block is to be migrated out of the first server 301. The configuring module 303 is further configured to remove the master flag of the data block on the first server 301 and remove the synchronizing flag of the data block on the second server 302 after data of the data block on the second server 302 and the data of the data block on the first server 301 are completely synchronized. The configuring module 303 further generates a master flag and a write flag for the data block on the second server 302.

The synchronizing component 305 has a feature of synchronizing data on a master server marked with a master flag to a slave server marked with a synchronizing flag. Further, the data synchronization system in this embodiment further includes a clearing module 306, where after the configuring module 303 removes the master flag of the data block on the first server 301, the clearing module 306 removes the data block on the first server 301 to reclaim space occupied by the data block.

Figure 5:
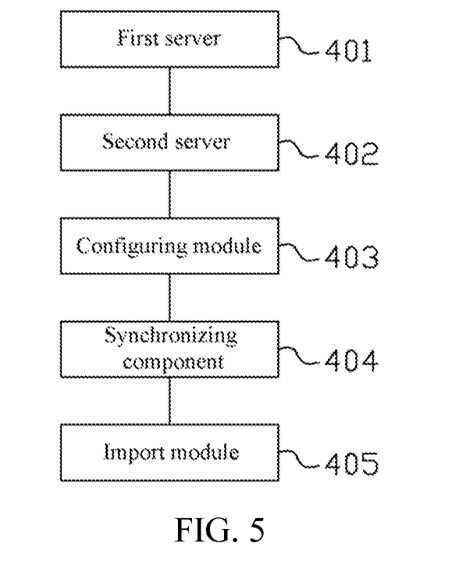
FIG. 5 is a schematic structural diagram of a data synchronization system according to a second embodiment of the present invention.

Referring to FIG. 5, FIG. 5 is a schematic structural diagram of a data synchronization system according to a second embodiment of the present invention, and the data synchronization system includes: a first server 401; a second server 402; a configuring module 403, a synchronizing component 404, and an import module 405. The configuring module 403 is configured to generate a synchronizing flag for a data block on the first server 401, and configured to generate a master flag and a write flag for the data block on the second server 402. The synchronizing component 404 is configured to synchronize data of the data block on the second server 402 to the first server 401. The configuring module 403 is further configured to remove the master flag of the data block on the second server 402 and remove the synchronizing flag of the data block on the first server 401 if an error occurs on the second server 402, and generate a master flag and a write flag for the data block on the first server 401. The import module 405 is configured to import a snapshot of the data block to the second server 402 after the second server 402 recovers from the error. The configuring module 403 is further configured to generate a synchronizing flag for the data block on the second server 402 after the second server 402 recovers from the error. The synchronizing component 404 is further configured to synchronize data of the data block on the first server 401 to the second server 402 after the second server 402 recovers from the error. The configuring module 403 is further configured to remove the write flag of the data block on the first server 401 when a master status of the second server 402 for the data block is to be restored. Further, the configuring module 403 is further configured to remove the master flag of the data block on the first server 401 and remove the synchronizing flag of the data block on the second server 402 after data of the data block on the second server 402 and data of the data block on the first server 401 are completely synchronized, and generate a master flag and a write flag for the data block on the second server 402 and generate a synchronizing flag for the data block on the first server 401.

The synchronizing component 404 has a feature of synchronizing data on a master server marked with a master flag to a slave server marked with a synchronizing flag.

For further details of the data synchronization system in the foregoing embodiments, reference may further be made to the data synchronization method in the foregoing embodiments and related descriptions.

It should be noted that the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

A person of ordinary skill in the art may understand that all or some of the processes in the methods in the foregoing embodiments may be implemented by a computer program instructing relevant hardware. The program may be stored in a computer readable storage medium. When the program is executed, processes in the embodiments of the methods may be included. The storage medium may be a magnetic disk, an optical disc, a read-only memory (ROM), a random access memory (RAM), or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A data synchronization method, comprising:
providing a first server with a master flag and a write flag for a data block;
providing a second server;
importing a snapshot of the data block to the second server;
configuring a synchronizing flag for the data block on the second server;
synchronizing, by a synchronizing component, data of the data block on the first server to the second server;
removing the write flag of the data block on the first server when the data block is to be migrated out of the first server;
synchronizing, by the synchronizing component, latest data of the data block on the first server to the second server;
removing the master flag of the data block on the first server and removing the synchronizing flag of the data block on the second server after data of the data block on the second server and the data of the data block on the first server are completely synchronized; and
configuring a master flag and a write flag for the data block on the second server.

2. The data synchronization method according to claim 1, removing the master flag of the data block on the first server further comprising: deleting the data block on the first server to reclaim space occupied by the data block.

3. A data synchronization method, comprising:
providing a first server with a synchronizing flag for a data block;
providing a second server with a master flag and a write flag for the data block;
synchronizing, by a synchronizing component, data of the data block on the second server with the first server;
removing the master flag of the data block on the second server and removing the synchronizing flag of the data block on the first server if an error occurs on the second server; and
configuring a master flag and a write flag for the data block on the first server;
importing a snapshot of the data block to the second server after the second server recovers from the error;
configuring a synchronizing flag for the data block on the second server;
synchronizing, by the synchronizing component, data of the data block on the first server to the second server;
removing the write flag of the data block on the first server when a master status of the second server for the data block is to be restored;
synchronizing, by the synchronizing component, latest data of the data block on the first server to the second server;

removing the master flag of the data block on the first server and removing the synchronizing flag of the data block on the second server after the data of the data block on the second server and the data of the data block on the first server are completely synchronized; and configuring a master flag and a write flag for the data block on the second server and configuring a synchronizing flag for the data block on the first server.

4. A data synchronization system, comprising:
a first server;
a second server;
a configuring module, configured to generate a master flag and a write flag for the data block on the first server;
an import module, configured to import a snapshot of the data block to a memory of the second server; and a synchronizing component, configured to synchronize data of the data block on the first server to the second server, wherein:
the configuring module is further configured to generate a synchronizing flag for the data block on the second server;
to remove the write flag of the data block on the first server when the data block is to be migrated out of the first server; and to remove the master flag of the data block on the first server and remove the synchronizing flag of the data block on the second server after data of the data block on the second server and data of the data block on the first server are completely synchronized, and to generate a master flag and a write flag for the data block on the second server.

5. The data synchronization system according to claim 4, further comprising a clearing module, wherein after the configuring module removes the master flag of the data block on the first server, the clearing module clears the data block on the first server to reclaim space occupied by the data block.

6. The data synchronization system according to claim 4, wherein the synchronizing component synchronizes data on the first server marked with a master flag to the second server marked with a synchronizing flag.

7. A data synchronization system, comprising:
a first server;
a second server;
a configuring module, configured to generate a synchronizing flag for a data block on the first server, and configured to generate a master flag and a write flag for the data block on the second server;
a synchronizing component, configured to synchronize data of the data block on the second server to the first server; and
an import module, configured to import a snapshot of the data block to a memory of the second server after the second server recovers from the error, wherein:
the configuring module is further configured to remove the master flag of the data block on the second server and remove the synchronizing flag of the data block on the first server if an error occurs on the second server, and generate a master flag and a write flag for the data block on the first server; and to generate a synchronizing flag for the data block on the second server after the second server recovers from the error;
the synchronizing component is further configured to synchronize data of the data block on the first server to the second server after the second server recovers from the error; and
the configuring module is further configured to remove the write flag of the data block on the first server when a master status of the second server for the data block is to be restored; and to remove the master flag of the data block on the first server and remove the synchronizing flag of the data block on the second server after data of the data block on the second server and data of the data block on the first server are completely synchronized, and generate a master flag and a write flag for the data block on the second server and generate a synchronizing flag for the data block on the first server.

8. The data synchronization system according to claim 7, wherein the synchronizing component synchronizes data on a master server marked with a master flag to a slave server marked with a synchronizing flag.

* * * * *